United States Patent Office 3,033,387
Patented May 8, 1962

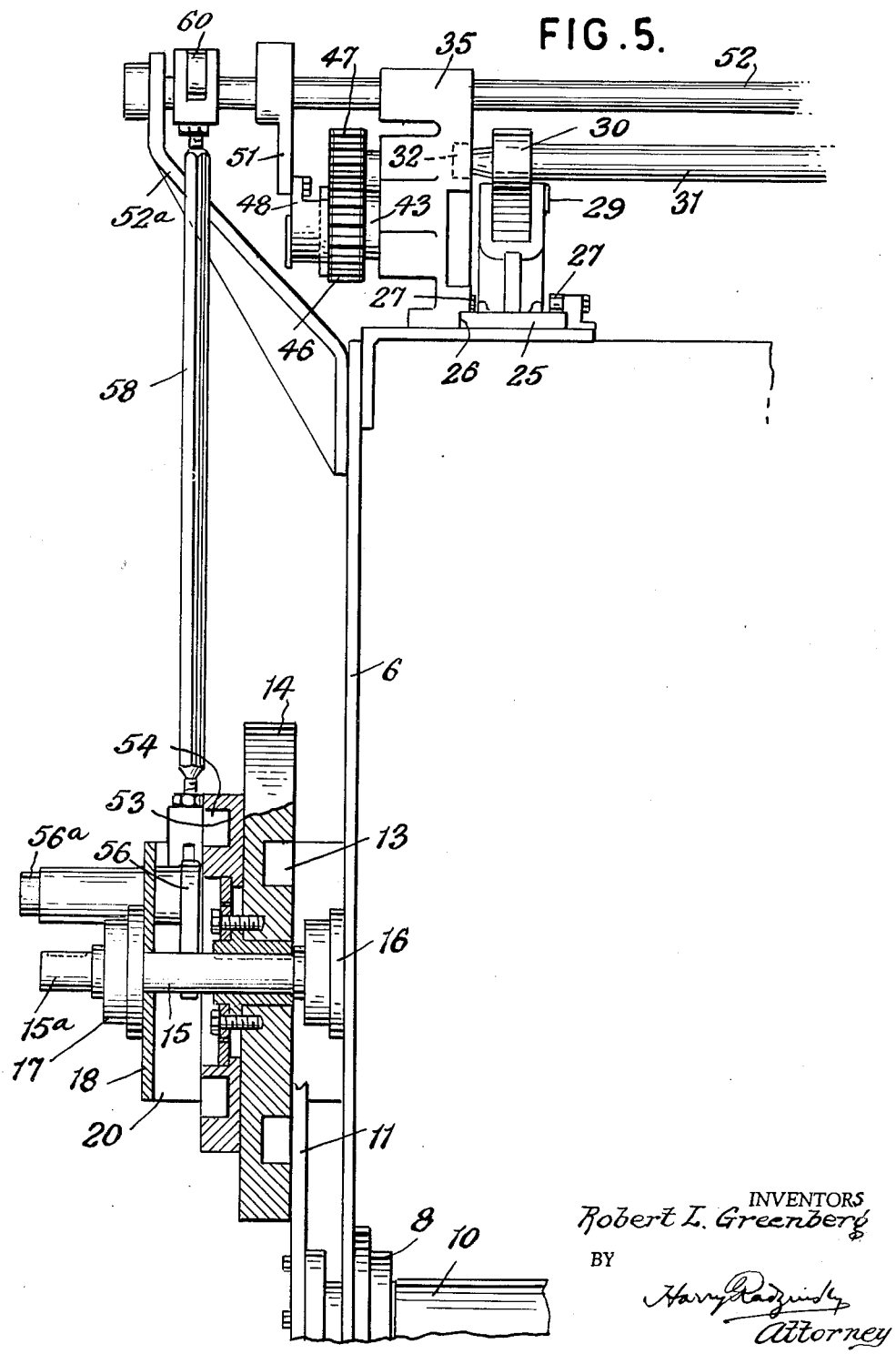

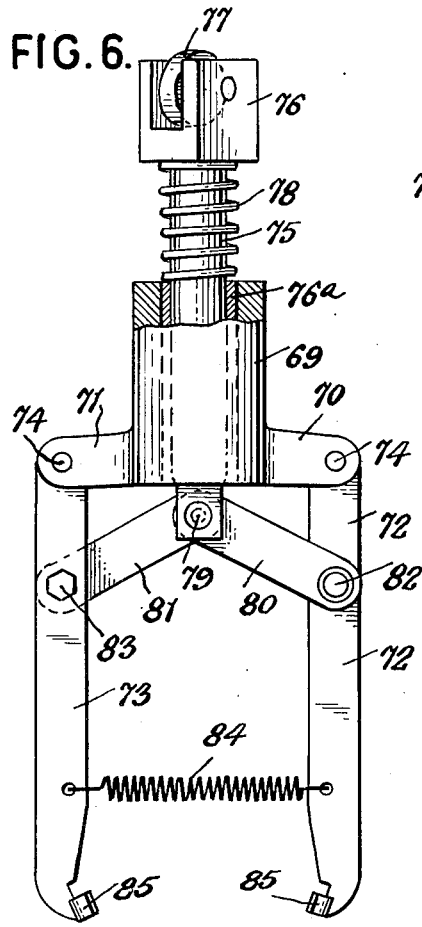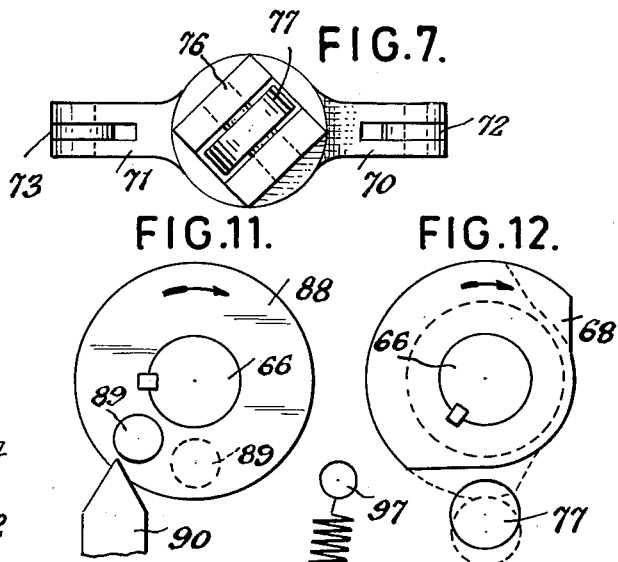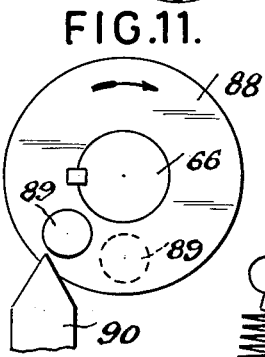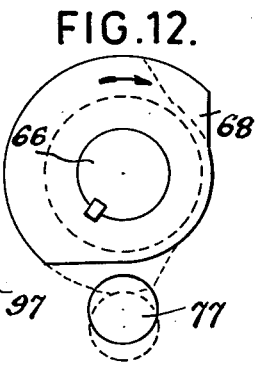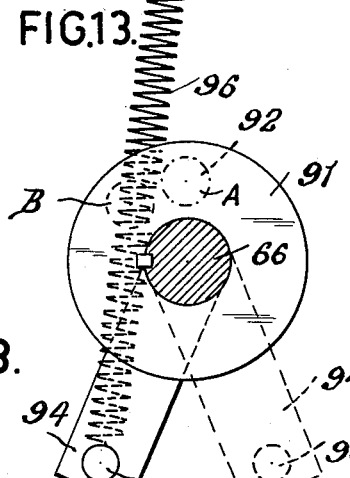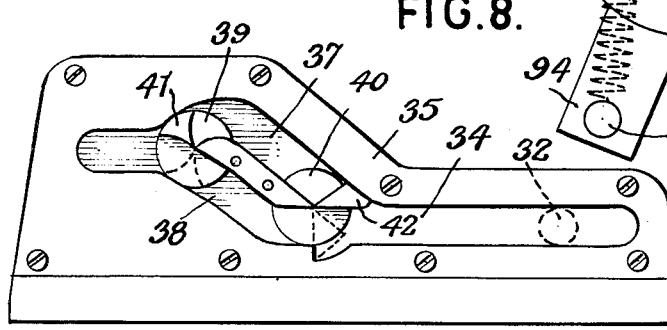

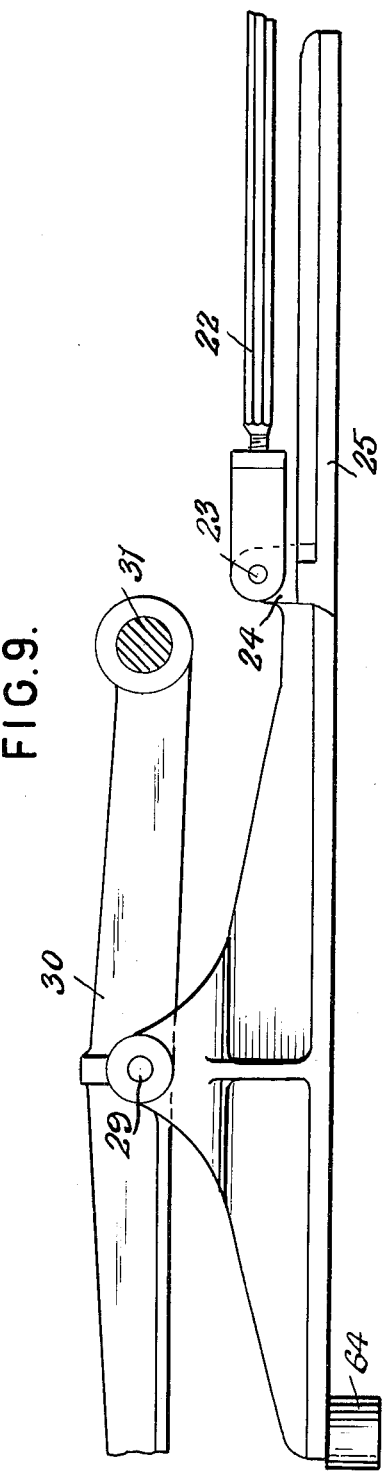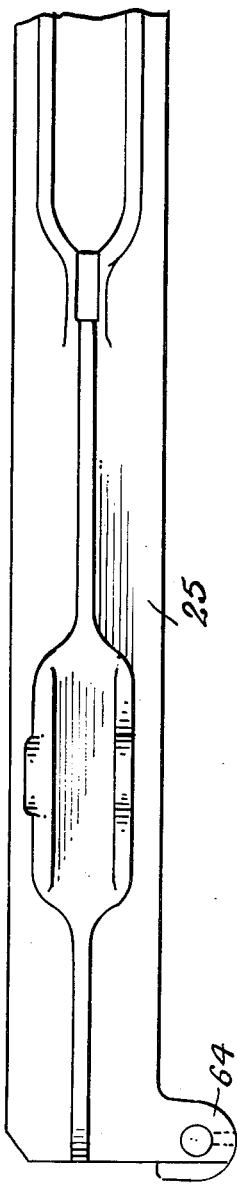

3,033,387
ARTICLE TRANSFERRING APPARATUS
Robert L. Greenberg, Englewood, N.J., assignor to National Equipment Corporation, New York, N.Y., a corporation of New York
Filed June 18, 1959, Ser. No. 821,145
3 Claims. (Cl. 214—1)

This invention relates to conveying or transporting apparatus, and more particularly to an apparatus which picks up small articles, such as for example, filled cups, pieces of candy, or various other articles from a movable element or support and deposits them on a conveyor or other moving conveyance and which might be moving at an angle to the element or support from which the articles are initially picked up.

It is an object of the invention to provide an apparatus of this character which will simultaneously pick up one or more rows of the articles and deposit them on a conveyor moving at an angle to the support from which they are picked up, and which conveyor may, if desired, be operating on a level different from that at which the support is operative.

It is an object of the invention to provide an apparatus of this kind by which a plurality of cups or other articles will be simultaneously engaged while said articles are being transported by a conveyor; the articles being lifted therefrom and raised above the conveyor and then shifted in a direction transversely of the movement of the conveyor and then lowered and deposited on a second conveyor with the latter possibly, but not necessarily, operating in a direction transversely of the movement of the first conveyor and at a higher level.

It is a further object of the invention to provide an apparatus of the kind described by which a substantial number of the articles will be simultaneously picked up and conveyed from one point to another.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a side elevational view of an apparatus made in accordance with the invention;

FIG. 5 is an end view, with parts in section, of a portion of the machine;

FIG. 6 is an elevational view, with parts in section of one of the cup lifters or grippers;

FIG. 7 is a top plan view of the same;

FIG. 8 is a view of the inner side of one of the cam slot brackets;

FIG. 9 is a side elevational view of one of the slides and the rocker arm pivotally mounted in it;

FIG. 10 is a top plan view of a portion of one of the slides;

FIG. 11 is a diagrammatic view of one of the cam-operating drums, showing the action of one of the studs on the drum;

FIG. 12 is a diagrammatic view showing the operation of the cams on the grippers, and FIG. 13 shows the second drum and indicates how the same is moved by contact of its pin with a stationary stop member.

Figure 1:
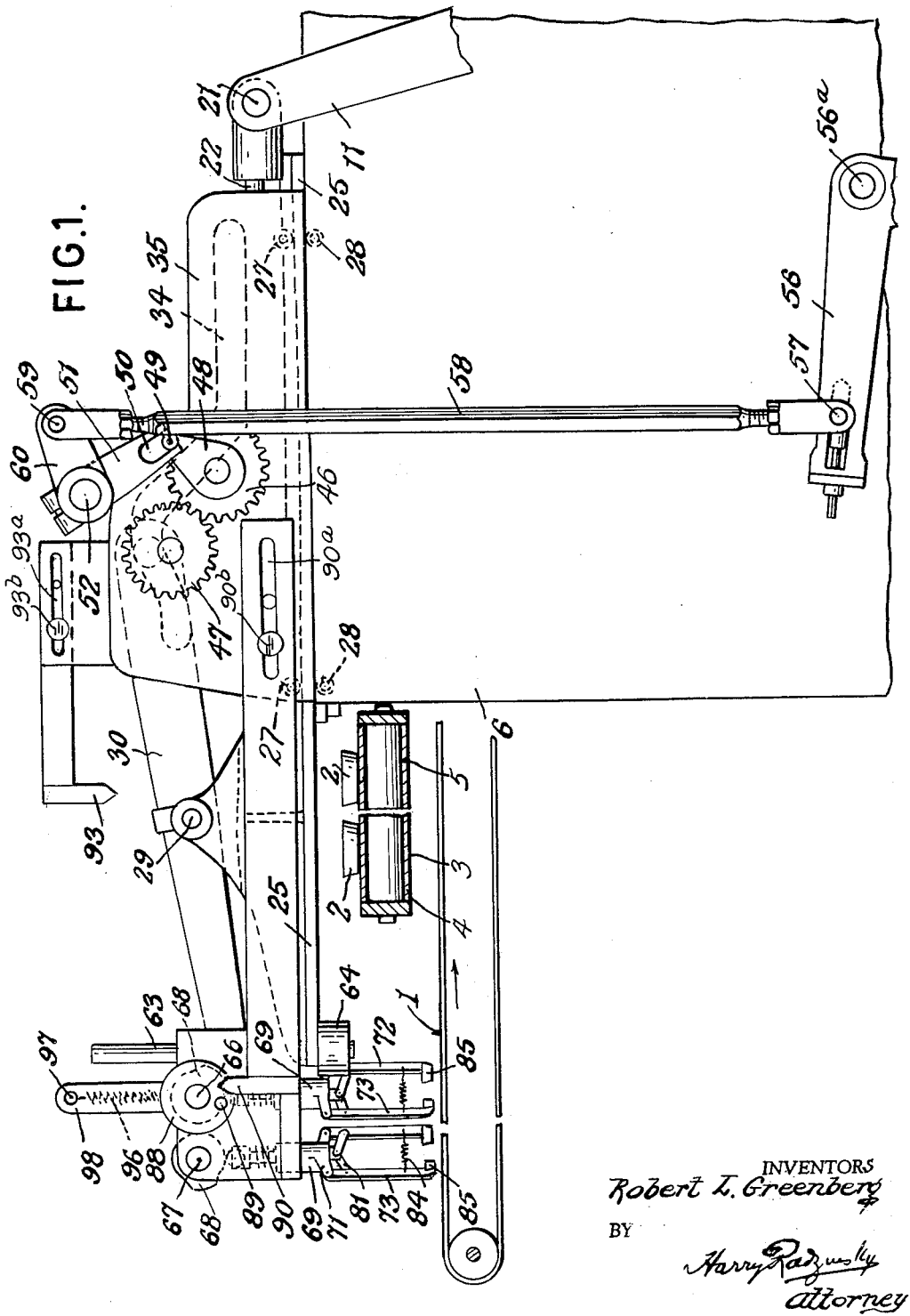
Figure 2:
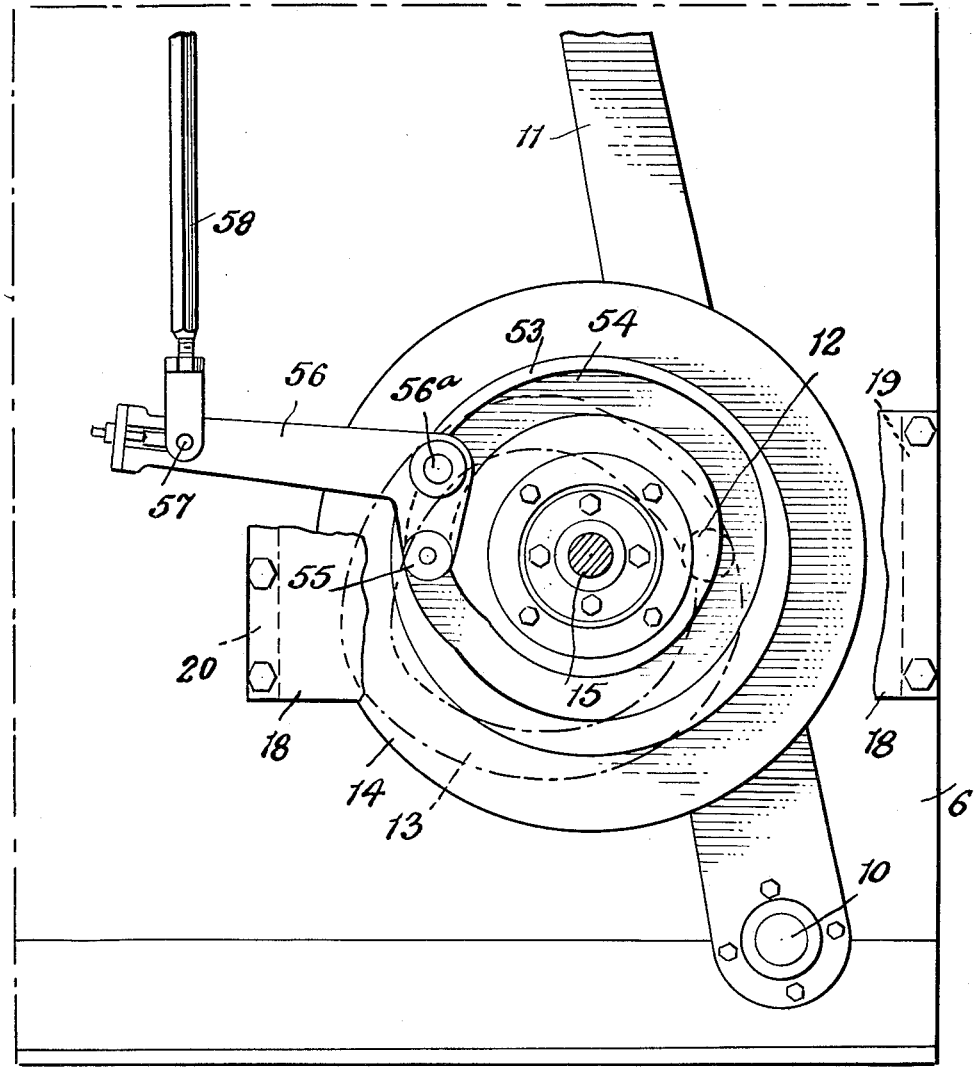
FIG. 2 is a side elevation, partly in section, of the lower portion of the apparatus shown in FIG. 1.

Referring to the drawings, an apparatus is therein shown for picking up objects, such as candy-filled cups and numerous other small objects, from trays carried on a conveyor, shown at 1 in FIG. 1 and which may be moved toward the right in said figure in its travel from its point of loading to the point of pick-up. The cups shown at 2 on the conveyor 3 where they have been placed after having been picked up and carried from the conveyor 1, are deposited on the second conveyor, or that shown at 3. In the embodiment shown, the latter conveyor consists of two oppositely-moving conveyor sections 4 and 5, although it may, of course, be a single conveyor movable either parallel to or at an angle to the first conveyor 1. As shown, the conveyor 3 is located at a higher level than the conveyor 1 and is movable at right angles thereto.

In the operation of the apparatus, two rows of grippers are brought down over the conveyor 1 on which trays of the cups are carried; the lifter fingers of the grippers are closed on the cups, and then the grippers, carrying the cups between their fingers, are carried toward the conveyor 3 while being elevated, and when the grippers are positioned above the conveyor 3, and the fingers of the grippers are opened to release the cups and permit them to come to rest on the conveyor sections 4 and 5 and brought thereby to a remote point for packing or other handling.

In the drawings 6 indicates one of the side walls of the machine, and 7 indicates the opposite side wall. Mounted for oscillating movement in bearings 8 and 9 on the respective side walls 6 and 7 is a rocking shaft 10 to which is secured the lower end of a lever 11 carrying a cam roller 12, operative in a cam groove 13 formed in a cam 14 mounted on a shaft 15 rotative in bearings 16 and 17, the bearing 16 being mounted on the wall 6 while the bearing shown at 17 is mounted on the plate 18 spaced from and connected to the wall 6 by the end plates 19 and 20.

Shaft 15 is the drive shaft of the apparatus and is driven in any suitable manner and preferably by chain drive from the driving shaft of the conveyor 1, thus insuring proper timing, to a sprocket not shown, but which is keyed on the end part 15a of the shaft 15.

At the opposite end of the rocking shaft 10 is mounted a lever 11a similar to lever 11, but without the cam roller, and extending between the upper ends of the two levers 11 and 11a is a shaft 21. Pivotally connected to shaft 21 are links 22 and 22a, the link shown at 22 having one end attached at 23 to a lug 24 (FIG. 9) on a slide indicated at 25. One end of the link 22a is similarly connected to a second slide, shown at 25a. By means of the cam mechanism thus far described, the slides 25 and 25a constituting part of the gripper carriage, are reciprocated for the distance required to move the grippers from the pick-up point over the conveyor 1 to the point of deposit of the transported cups on the conveyor 3. The slides 25 and 25a are mounted in guideways 26 and between rollers 27 and 28.

Figure 3:
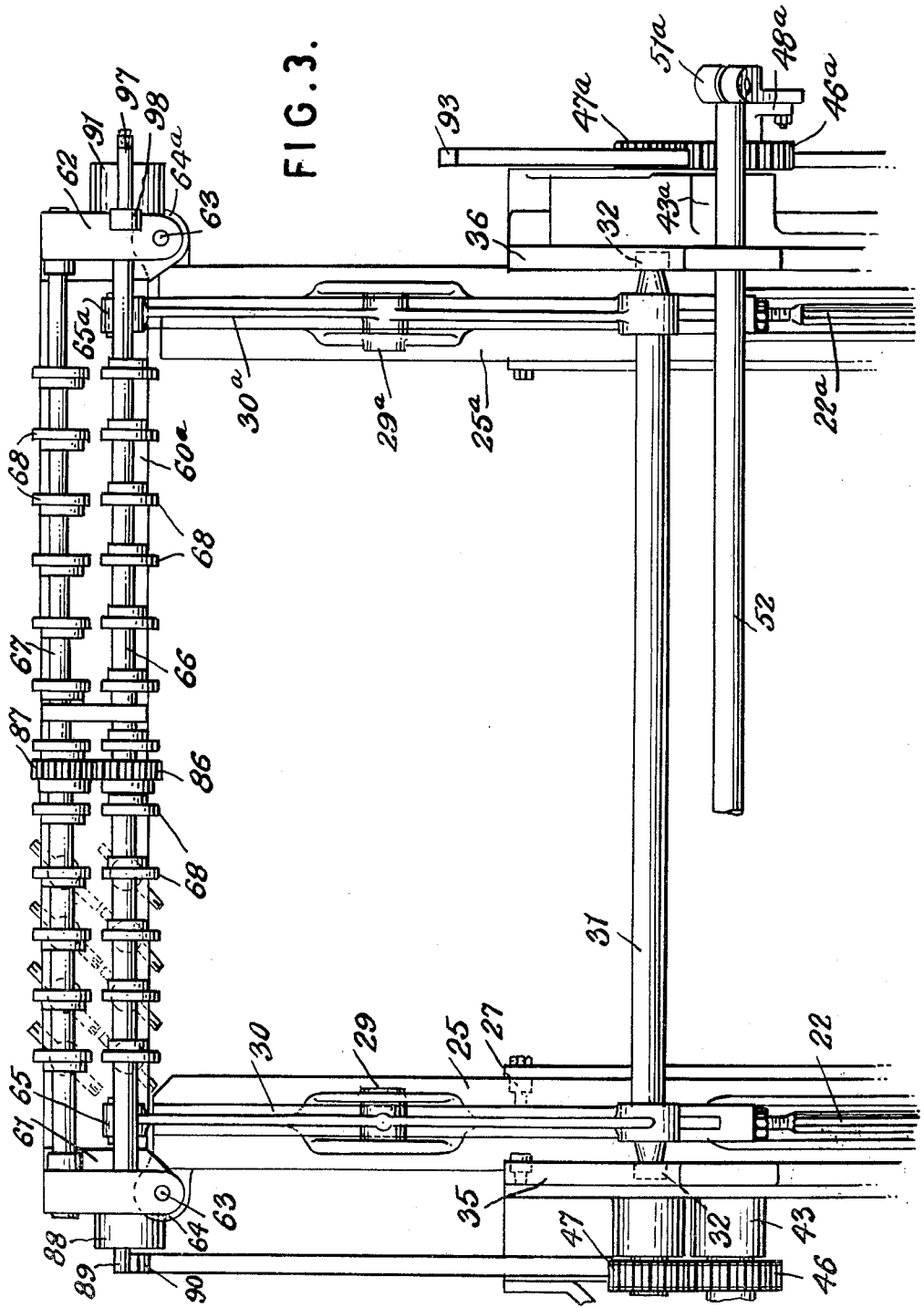
FIG. 3 is a top plan view of most of the apparatus shown in FIG. 1.
Figure 4:
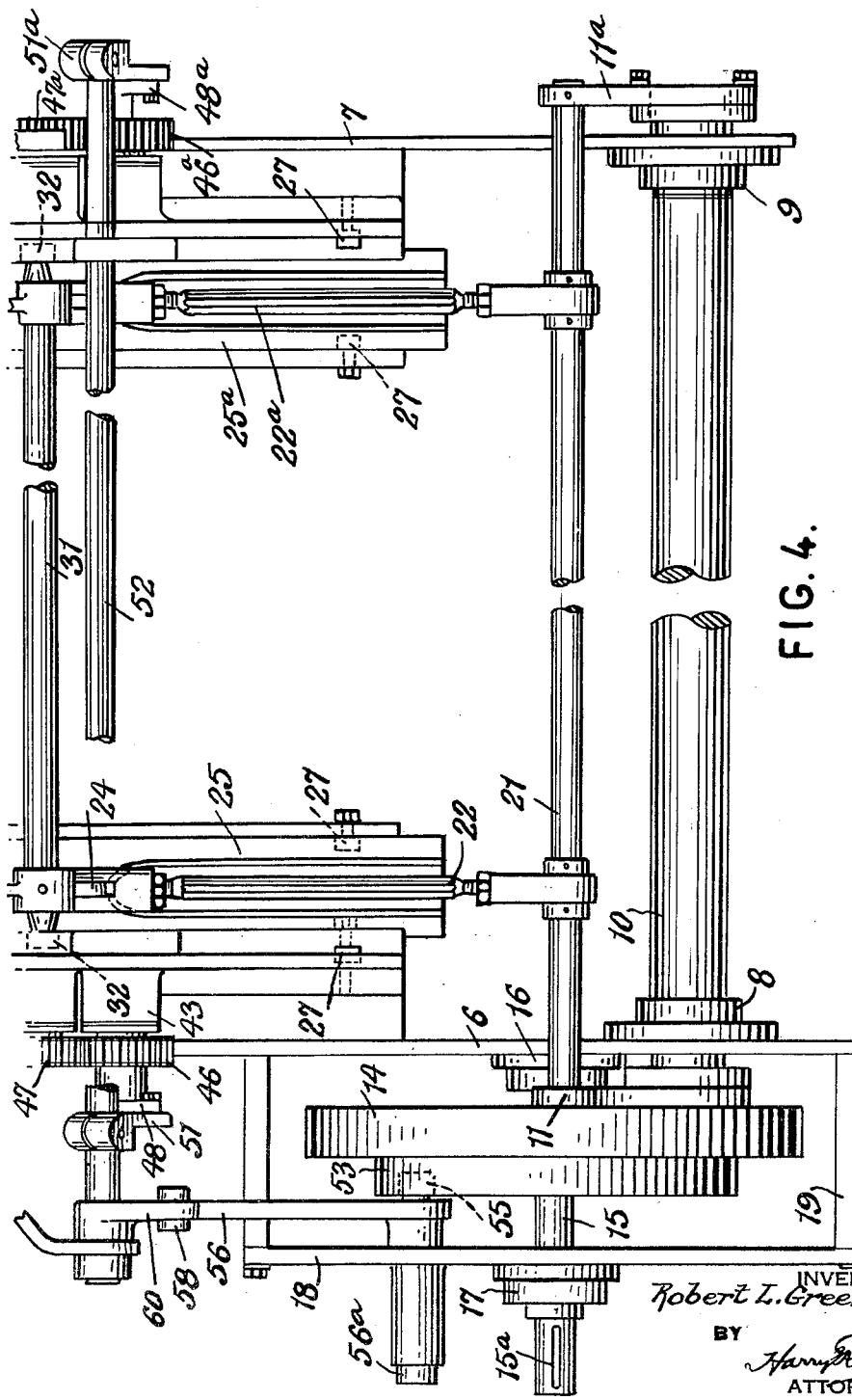
FIG. 4 is a top plan view of the remainder of the apparatus of FIG. 1; the view being a lower continuation of the disclosure of FIG. 3.

Pivotally mounted at 29 in the slide 25 is a rocker arm 30, and a similar rocker arm 30a is pivotally mounted at 29a in the slide 25a. The rear ends of the rocker arms 30 and 30a are connected by means of a cross rod 31, provided at each end with a cam roller 32. The rocker arms 30 and 30a, the cross bar 31 and a gripper-supporting plate 60a form a pivoted frame constituting a part of the gripper carriage. The cam roller 32 to the left in FIG. 3 is operative in a cam groove 34 (FIG. 8) provided in a cam bracket 35 and the roller 32 at the opposite end of the cross rod 31 is operative in a similar cam groove provided in a cam bracket 36 located at the opposite side of the machine.

The cam rollers 32, movable in the cam grooves 34 in a manner to be described, are effective to cause the pivotal movements of the gripper frame and hence the raising and lowering movements of the grippers at the proper times to position the grippers for pick-up and delivery of the cups.

As will be noted in FIG. 8, each of the cam grooves in the brackets 35 and 36 is divided into upper and lower sections indicated respectively at 37 and 38, and rotatable switching members 39 and 40 are operative to block off either of these sections of the grooves at the required times in order to cause the cam rollers 32 to follow the required parts of the grooves to enable the grippers to become positioned accordingly. The switching member 39 is provided with a segment 41 which is adapted, by rotative movement of the switch member 39, to be positioned in either the full-line position or the dotted line position shown in FIG. 8. The switching member 40 is provided with a segment 42 which is adapted for positioning, by rotative movement of the switching member 40, in either the full-line position or the dotted-line position shown in FIG. 8. When the two segments 41 and 42 are located in the full-line position, it will be seen that the same serve to block off the upper section 37 of the cam groove, and when the segments are located in the dotted-line position, the same will then block off the lower section of the cam groove. The apparatus is so timed that at the proper times the switching members become effective to shunt the cam rollers 32 into the required sections of the cam groove. The use of a double-path cam as above described, rather than a single-groove cam, is had to permit a slightly faster movement of the gripper carriage from the deposit to pick-up position, than would be had by the use of a single cam groove.

The switching member 40 has its shaft rotative in a bearing 43 provided on the cam bracket 35, and at the opposite side of the machine the similar switching member has its shaft mounted in a bearing 43a. The shaft of the switching member 40 carries a gear 46 meshing with a gear 47 on the shaft of the switching member 39 and at the opposite side of the machine, gears 46a and 47a are also in mesh. Extending from the shaft of the switching member 40 is a radial arm 48 provided at its end with a roller 49 engaging a slot 50 in an arm 51 secured on a cross shaft 52. Said cross shaft 52 extends across the machine and is supported at one end by a bracket 52a, and said shaft has an arm 51a engaging the arm 48a as explained in connection with the arm 48. This arrangement is such that by the rocking of the shaft 52, the gears 46 and 46a will be rotatively moved and will, through their meshed engagement with gears 47 and 47a, cause the latter gears to turn and the switching members 39 and 40 to be positioned accordingly. The rocking movement of the cross shaft 52 is effected by means of a cam 53 on the shaft 15, which cam is provided with a cam groove 54, engaged by a cam roller 55 carried by one arm of a bell crank lever 56 pivotal in the plate 18 on a stud shaft 56a, and having its other arm connected by an adjustable pivot 57 to the lower end of a link 58. The upper end of the link 58 is pivotally connected at 59 to an arm 60 secured on the cross shaft 52 and projecting radially therefrom.

The carriage for the grippers includes the lengthy base member or plate shown at 60a provided at its opposite ends with bearing members shown respectively at 61 and 62. Each of the bearing members is vertically slidable on a post 63 and the forward end of the slide 25 is formed with a boss 64 in which the post 63 is mounted. At the opposite end of the machine the slide 25a also has a lug, shown at 64a in which the post 63 at that location is mounted.

At its forward end, the rocker arm 30 is pivotally connected at 65 to bearing bracket 61, and the rocker arm 30a is similarly connected to the bearing bracket 62 as indicated at 65a. By this arrangement it will be evident that the gripper-carrying frame on the carriage is pivotally raised or lowered to the required extent at the proper times for elevating the cups from the first conveyor, or that indicated at 1 and subsequently bringing them into the deposit position on the second conveyor 3.

Rotatively mounted in the bearing members 61 and 62 are the cam shafts 66 and 67, both of which shafts carry the cams 68 for causing the opening and closing of the gripping fingers, the construction of the gripping devices being more clearly shown in FIGS. 6 and 7. It will be therein observed that each of the gripping devices includes a hub 69 fixedly mounted in the base plate 60a of the carriage. Extending radially at diametrically opposite points on the hub 69 are arms 70 and 71. The upper end of each of the gripping fingers 72 and 73 is pivoted at 74 in the bifurcated ends of the respective arms 70 and 71. A stem 75 is slidable through a bushing 76a in the hub 69 and secured at the upper end of the stem 75 is a clevis 76 in which a cam roller 77 is mounted. Said roller 77 is urged against the periphery of one of the cams 68 by means of a coil spring 78 located between the clevis 76 and the hub 69. At its lower end the stem 75 is pivoted at 79 to links 80 and 81. Link 80 has its end pivoted with a pin-and-slot connection at 82 to the finger 72, while link 81 has its end pivoted with a similar pin-and-slot connection at 83 to the finger 73. A coil spring 84 connects the fingers 72 and 73 near their lower ends. At its lower end, each of the fingers 72 and 73 is provided with an arcuately-shaped cushion 85 to avoid damage to the cups and their contents when gripped between the fingers.

In the embodiment shown, the grippers are arranged in two rows of twelve each, with the grippers disposed angularly so that those in one of the rows will have clearance with respect to those in the adjacent row, thus permitting the cups to be placed relatively close together in the tray from which they are picked up. Thus, twenty-four cups will be simultaneously picked up and transported from one conveyor to the other. It will, however, be understood that the machine may be readily built to enable it to pick up and convey more or less cups than herein specifically mentioned.

Provided on the shaft 66 is a gear 86 (FIG. 3) in mesh with a gear 87 carried on the shaft 67, so that when shaft 66 is rotatively moved in a manner to be described, it will tend to rotate the shaft 67 so that simultaneous operation of all of the cams 68 on both of the shafts 66 and 67 will take place and the gripper fingers operated accordingly. Mounted on one end of the shaft 66 is a drum 88, provided with an eccentrically positioned, axially extending pin 89 adapted to be contacted by a stop member 90, fixed to but adjustable on the cam bracket 35 by means of the slot 90a and the set screw 90b. On the opposite end of the cam shaft 66 is provided a similar drum carrying a projecting pin 92 (FIG. 13). The pin 92 is so positioned that it will contact with a stop member 93 fixedly, but adjustably secured by means of the slot 93a and set screw 93b to the cam bracket 36. As shown in FIG. 13, the end of the shaft 66 adjacent to the drum 91 carries a radially-extending arm 94 having a pin 95 to which one end of a coil spring 96 is attached, the opposite end of the spring being secured to a pin 97 projecting from the upper end of a post 98 formed on and extending upwardly from the top of the bearing member 62.

Briefly, the operation of the apparatus is as follows:

When the connected slides 25 and 25a are in their forward position, or that to the left of FIG. 1, the cam rollers 32 are located in the left ends of the cam slots 34. When the slides are moved to the position where the grippers are positioned above the cups in a tray on the conveyor 1, the pin 89 has contacted the stop 90, thus causing rotative movement of the drum 88 on the shaft 66 from the dotted-line position of the pin 89 to the full line position. This rotative movement of the shaft 66 causes shaft 67 to be rotated through the gears 86 and 87, and the cams 68 on both of the shafts 66 and 67 have permitted movement of the gripper fingers 72 and 73 toward one another in a manner and to an extent to cause the fingers to grip the cups between them. The cam rollers 32, moving toward the right in FIG. 8, as the carriage is moved in that direction, proceed into the upper section 37 of the cam slot (the lower section being at this time blocked off by segment 41) the grippers rise, and carrying the cups which they have picked up from the tray on conveyor 1, they are moved to position over the conveyor 3. When the drum 88 was turned by contact with the stop 90, to move the pin 89 from the dotted-line position of FIG. 11 to the full line position shown therein, shaft 66 was moved to an extent to place the arm 94 thereon in the position in which it is shown in full lines in FIG. 13 to thereby render the coil spring 96 effective to retain the shaft 66 in such position. Now, as the apparatus reaches the position wherein the grippers, carrying the cups, are located above the conveyor 3, the pin 92 will come into contact with the stop 93 and the pin will be moved from the position "A" in FIG. 13 to position "B." This causes turning of the shafts 66 and 67 to an extent sufficient to cause the cams 68 on said shafts to force the cam rollers 77 downwardly from the full-line position to the dotted-line position of FIG. 12 and spread the gripping fingers 72 and 73 apart sufficiently to permit the cups held between them to drop down on the conveyor 3.

When movement of the slides and connected mechanism brings the cam rollers 32 to the end of their travel toward the right in FIG. 8, the rollers start their return travel toward the left, the rollers when moving in the latter direction, moving through the lower section 38 of the cam slots 34, the upper section of each of these slots being at this time blocked off by the switch segments 41 and 42 which are then in the full-line positions shown in FIG. 8. While the carriage of the machine is travelling to bring the grippers from conveyor 3 to the pick-up position above conveyor 1, the conveyor 1 was moved to an extent necessary to position a filled tray under the point of descent of the grippers, and which are then brought down to engage the cups in the tray and lift them and carry them to the conveyor 3 and deposit them thereon as above described.

Having thus described a single embodiment of the invention, it is obvious that the same is not to be restricted thereto, but is broad enough to cover all structures coming within the scope of the annexed claims.

What I claim is:

1. A transferring device comprising, a pair of conveyors moving at different levels, one of said conveyors passing beneath the other conveyor, a frame, a slidable carriage mounted for reciprocating movement on the frame, rocker arms pivotally mounted on the carriage and disposed above the same, a cross rod connecting the arms at one end of the same, cam rollers carried by said cross rod, cam brackets mounted on the frame and cam-grooves to receive the rollers and impart rocking movements to the rocker arms, a gripper-supporting frame extending between and connected to the opposite ends of the rocker arms, a plurality of rows of article grippers mounted in the gripper-supporting frame, each of the grippers including pivotal fingers movable toward one another, cam rollers associated with the fingers causing separating movement of the fingers, a pair of cam shafts extending over the gripper-supporting frame and operative on the cam rollers for the fingers, means for causing an oscillating movement of the first of the cam shafts, gear means for oscillating the second cam shaft upon oscillating movement of the first cam shaft, and means for reciprocating the carriage to bring it from a position over one of the conveyors to a position over the second conveyor.

2. A transferring device as provided for in claim 1, wherein the means for causing oscillating movement of the first of the cam shafts consists of disks carried by the first cam shaft, pins projecting from said disks, and fixed elements at the ends of travel of the carriage for contacting with said pins to respectively oscillate the first cam shaft when the grippers are located above the pick-up and delivery positions.

3. A transferring device comprising, a pair of spaced-apart conveyors, a frame, a carriage slidably mounted on the frame, a pair of rocker arms pivotally mounted on the carriage and connected at one end by a gripper-supporting frame, a plurality of rows of article-engaging grippers mounted in the gripper-supporting frame, each of the grippers including a plurality of pivotal fingers movable toward one another to grip articles between them and movable away from one another to release said articles, the rocker arms being connected at one end to a shaft carrying cam rollers, cam brackets mounted on the frame and having cam slots in which the rollers are operative, said slots being operative on the rollers to pivot the rocker arms in a manner to raise the article-engaging grippers from above one of the conveyors and to bring them to a position above the second conveyor, a plurality of cam shafts carried by the gripper-supporting frame in a position above the grippers and operative against cam rollers carried by the grippers, drive means associated with the cam shafts for oscillating both of them when one of them is oscillated, and means associated with the last-mentioned cam shaft for causing oscillation of the same.

References Cited in the file of this patent

UNITED STATES PATENTS

| 1,115,426 | Green | Oct. 27, 1914 |
| 1,835,570 | Lorenz | Dec. 8, 1931 |
| 1,849,038 | Ingle | Mar. 8, 1932 |
| 2,553,373 | Haytt | May 15, 1951 |
| 2,828,877 | Webster | Apr. 1, 1958 |
| 2,832,478 | Malewicz | Apr. 29, 1958 |

FOREIGN PATENTS

| 568,074 | Great Britain | Mar. 16, 1945 |
| 514,399 | Canada | July 5, 1955 |